United States Patent [19]
DeVolpi

[11] Patent Number: 5,912,612
[45] Date of Patent: Jun. 15, 1999

[54] MULTI-SPEED MULTI-DIRECTION ANALOG POINTING DEVICE

[76] Inventor: Dean R. DeVolpi, 629 Lariat, Unit B, Incline Village, Nev. 89450

[21] Appl. No.: 09/096,301

[22] Filed: May 31, 1998

Related U.S. Application Data

[60] Provisional application No. 60/061,825, Oct. 14, 1997.

[51] Int. Cl.[6] .................................................. H01C 10/06
[52] U.S. Cl. ............................... 338/95; 338/99; 200/512
[58] Field of Search ................................... 338/99, 95, 96, 338/97, 114; 200/1 B, 512, 513, 516

[56] References Cited

U.S. PATENT DOCUMENTS

| | | |
|---|---|---|
| 4,002,873 | 1/1977 | Lewandowski .......................... 200/314 |
| 4,257,305 | 3/1981 | Friend et al. ............................. 84/1.24 |
| 4,306,216 | 12/1981 | Azema et al. . |
| 4,352,084 | 9/1982 | Graves et al. . |
| 4,864,272 | 9/1989 | Cecchi et al. . |
| 4,896,003 | 1/1990 | Hsieh . |
| 5,278,557 | 1/1994 | Stokes et al. . |
| 5,376,913 | 12/1994 | Pine et al. . |
| 5,455,556 | 10/1995 | Ohm et al. ............................... 338/114 |
| 5,488,206 | 1/1996 | Wu . |
| 5,489,900 | 2/1996 | Cali et al. ................................. 341/34 |
| 5,498,843 | 3/1996 | Date et al. . |
| 5,541,622 | 7/1996 | Engle et al. . |
| 5,550,339 | 8/1996 | Haugh ..................................... 200/5 A |
| 5,675,309 | 10/1997 | DeVolpi . |

Primary Examiner—Lincoln Donovan
Assistant Examiner—Richard K. Lee
Attorney, Agent, or Firm—Quinn & Quinn, P.C.; William J. Quinn; Cornelius P. Quinn

[57] ABSTRACT

A low-cost pad pointing device with improved performance, reliability and durability, that can be used as a cursor pointing device for computers, remote controls, web TV, TV guide browsers, video games, consumer electronics, industrial controllers, medical, automotive and other applications. A protruding plus shaped segment can be deflected to positions on an electrical medium that results in the generation of a speed and direction signal to be interpreted by low cost available circuitry including microcontrollers.

18 Claims, 5 Drawing Sheets

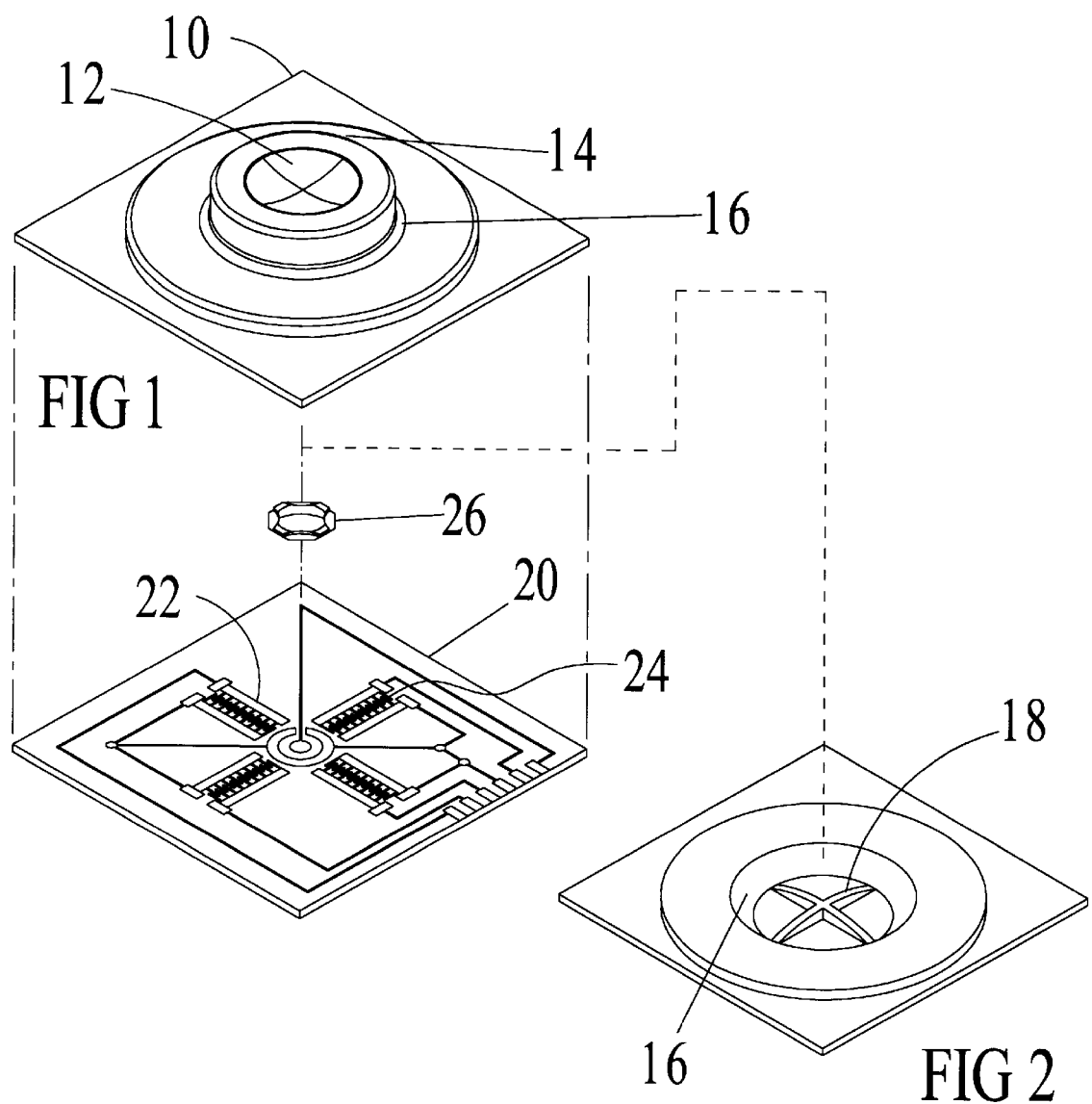
FIG 1
FIG 2
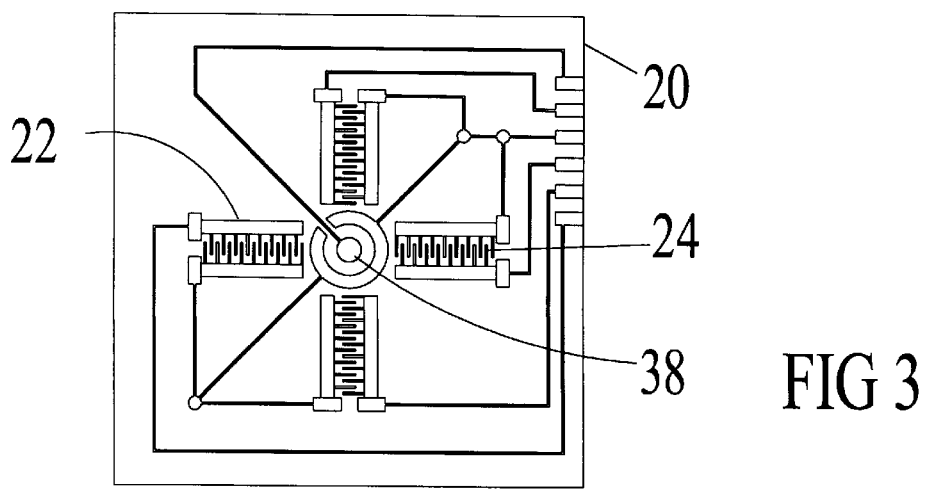
FIG 3

MULTI-SPEED MULTI-DIRECTION ANALOG POINTING DEVICE

CROSS REFERENCE TO RELATED APPLICATION

This application claims the benefit of U.S. provisional patent application Ser. No. 60/061825 filed Oct. 14, 1997 and entitled Resistive Pointing Technology which is incorporated herein by reference.

FIELD OF THE INVENTION

The present invention relates in general to multi speed multi direction pointing devices, and more specifically, to an improved multi speed multi direction analog pad pointing device.

BACKGROUND OF THE INVENTION

In the known art pointing devices are utilized in connection with computers, video game controls, hand held remote controls, web TV controls, consumer electronic controls, industrial controllers, medical equipment, automotive equipment and other similar applications. With such pointing devices, the user is allowed to readily control the speed and directional input and make selections within a particular application utilizing a single control. It is the objective of such pointing devices to provide a rapid and effortless means of control in an application and minimize fatigue and the amount of interrupted action required of the user.

Representative pointing devices of the known art and their shortcomings will now be described.

U.S. Pat. No. 4,352,084 to Graves et al discloses a variable resistor with a substrate that has various conductive and resistive regions for varied output. The drawback of such device being that it not capable of dual X-Y axis output.

U.S. Pat. No. 4,864,272 to Cecchi et al discloses a joystick controller utilizing a sliding contact on resistive and conductive regions that are parallel to one another and perpendicular to the center of the axis of movement. The drawback to this method of creating an output that may be interpreted into speed and direction, is that operational contact results in abrasion of the resistive and conductive regions as well as requiring many components to accomplish the variable resistive output.

U.S. Pat. No. 5,498,843 to Date et al discloses a pivoting digital only pointing device that makes contact in the direction of a direct axis. Date teaches the use of a single speed and eight directions. Date does not teach the use of resistive regions for variable speeds and increased variability of direction. The resultant drawback being that the Date device is limited in variability of speed and direction.

U.S. Pat. No. 4,896,003 to Hsieh discloses a pivoting pad, digital only, pointing device that makes contact in the direction of a direct axis. Hsieh also teaches the use of parallel conductive digital traces that extend perpendicularly from the center. The resultant drawback being that the Hsieh device is limited in its number of digital contacts due to congestion; thus, it is impractical to provide a device having a greatly variable number of speeds and directions.

U.S. Pat. No. 5,488,206 to Wu discloses the use of conductive rubber and membrane switches in a digital fashion to supply speed and directional output; and is therefore limited to providing a small number of speeds.

U.S. Pat. No. 5,376,913 to Pine et al discloses the use of a solid conductive curved disc and that a single resistor can be contacted to affect a change in resistance. The drawback to the Pine device being that, Pine does not anticipate the use multiple resistors for pointing or the use of just a segment of the conductive disc to minimize costs.

U.S. Pat. No. 5,675,309 to DeVolpi discloses the use of a continuous curved disc that pivots on a substrate that has resistive and conductive elements completely covering or surrounding the center of a printed circuit board in a continuous 360 degree area. The drawbacks to the DeVolpi device being that directions other than the true axis are hard to control for infinite controlled proportional resolution due to the footprint of the conductive rubber disc; and truly consistent varied angles cannot be achieved. Further, the solid conductive curved disc is the most expensive component of the disclosed technology.

Finally, U.S. Pat. No. 5,278,557 to Stokes et al discloses a force-sensitive variable resistor that operates using triangulation. The drawback to this method of providing a speed and direction output is that a polymer force-sensitive material is utilized, and the inherent properties of such a material result in having to apply excessive force to get an increased speed output, which in extended use can cause fatigue in the user. Accordingly it is the object of the present invention to provide an improved multi speed multi direction analog pad pointing device eliminating the shortcomings of the above identified known art, and which can be mass produced and assembled with consistent quality at a cost comparable to a conventional pointing device, requiring a reduced amount of effort in operation and having greater resolution and variability of speed and directional output.

SUMMARY OF THE INVENTION

The objects of the present invention are attained by a multi speed multi direction pad pointing device which uses a top cover, which on its bottom, has an elastic protruding plus shaped segment which is either electrically conductive or resistive on its bottom surface and has a number of ribs which radiate out from its center at various angles. The top cover is formed with an elastic return ridge that encircles the protruding plus shaped segment and may be caused to bend and flex when in operation. A substrate such as a printed circuit board, glass, paper, ceramic or plastic which has conductive lines and resistive coatings formed on it or embedded within it, homogeneous throughout or likewise provided on the surface is positioned below the plus shaped segment of the top cover. Force is applied in operation to deform the return ridge and cause the plus shaped segment to move downward and tilt in orientation so that contact is made with the conductive or resistive tracts of the substrate in a location corresponding to the direction and degree of the force applied such that an output signal is provided that may be translated by analog to digital or RC timing circuitry into speed and direction vectors. As the plus shaped segment is elastic, once contact is made between the plus shaped segment and the substrate, additional downward force may be utilized to deform the plus shaped segment and provide fine resolution control. Finally, as the return ridge is elastic, the plus shaped segment returns to its unbiased position when force is removed in operation.

The objects of the present invention are also attained by an alternative embodiment of the present invention, which utilizes a top cover, which on its bottom, has an elastic protruding plus shaped segment which has a number of ribs which radiate out from its center at various angles. The top cover is formed with an elastic return ridge that encircles the protruding plus shaped segment and may be caused to bend and flex when in operation. A membrane switch is placed below the protruding plus shaped segment and has resistive and conductive surfaces facing each other with dielectrics to prevent the resistive and conductive surfaces from making contact in the unbiased position. Force is applied in operation to deform the return ridge and cause the plus shaped segment to move downward and tilt in orientation so that contact is made with the membrane causing contact to be made between conductive and resistive surfaces in a location corresponding to the direction and degree of the force applied such that an output signal is provided that may be translated by analog to digital or RC timing circuitry into speed and direction vectors. As the plus shaped segment is elastic, once contact is made between the plus shaped segment and the membrane switch, additional downward force may be utilized to deform the plus shaped segment, thereby varying the contact made between the conductive and resistive regions of the membrane switch and provide fine resolution control.

Finally, as the return ridge is elastic, the plus shaped segment returns to its unbiased position when force is removed in operation.

It can be observed from the present invention, that by utilizing an elastic return ridge to control the contact position of the protruding plus shaped segment with the substrate, and also to return the present invention to its unbiased position, the amount of force required of the operator is minimized, resulting in increased control and decreased fatigue for the operator over extended periods of continued use. Further, as the present invention may utilize continuous resistive tracts or surfaces, the number of directions is increased, and the number of speeds is limited only by the analog to digital circuitry employed. Still further, as the protruding plus shaped segment is sectioned into a number of ribs radiating from its center, the amount of conductive rubber is reduced, reducing the cost accordingly. Additionally, the small number of simple component parts will allow the present invention to be mass produced at a consistent quality and uniformity at no additional manufacturing cost to a conventional remote control.

Other objects, advantages and novel features of the present invention will become apparent from the following drawings and detailed description of the preferred embodiments.

BRIEF DESCRIPTION OF THE DRAWINGS

FIG. 1 is an exploded perspective view of the present invention displaying the cover with a dimple, dome switch and substrate.

FIG. 2 is a perspective view of the bottom of the cover shown in FIG. 1 displaying the protruding plus shaped segment.

FIG. 3 is a plan view of the substrate shown in FIG. 1 displaying the resistive and conductive paths thereon.

DETAILED DESCRIPTION OF THE PREFERRED EMBODIMENTS

Figure 4:
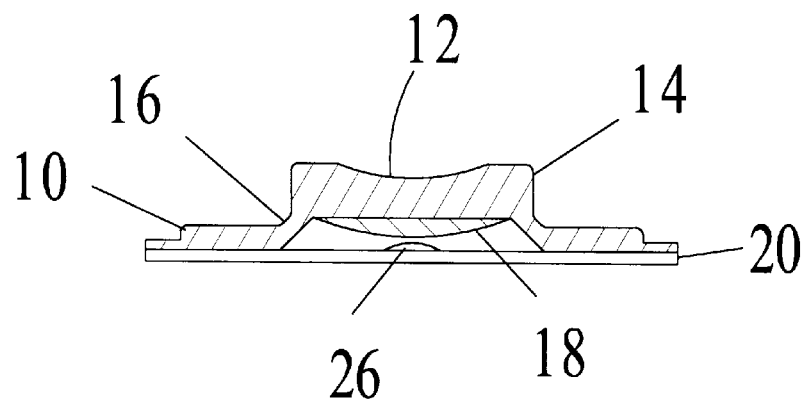
FIG. 4 is sectional view of the present invention shown in FIG. 1.

The present invention will now be described with reference to FIGS. 1 through 4.

The pad pointing device of the present invention shown in FIGS. 1 through 4 comprises a cover 10, which on its top surface has a dimple 12 formed within the top of the pad 14, wherein a finger may be placed within dimple 12 of pad 14 to apply compression and tilting forces in operation of the pad pointing device. Cover 10 is formed with a return ridge 16 surrounding pad 14, which may be caused to bend and flex when external force is applied to pad 14 through dimple 12, and which causes pad 14 to return to an unbiased position when such external force is removed from pad 14. Further, cover 10 has a protruding plus shaped segment 18 formed on or attached to its bottom surface directly below dimple 12 and encircled within return ridge 16; protruding plus shaped segment 18 is shaped with a number of ribs which radiate out from its center at various angles and is preferably formed of an elastic material that may be deformed when a force is applied. The lower surface of protruding plus shaped segment 18 is electrically conductive or resistive. The pad pointing device further comprises a substrate 20 which has resistive regions 22 and conductive regions 24 formed on or within is upper surface. The conductive regions 24 are electrically connected to resistive regions 22 and are arranged in a alternating ladder fashion of contacts radiating out from the center of substrate 20 at various angles. The substrate 20 is positioned with its upper surface facing the bottom surface of cover 10 in such orientation that the conductive regions 24 are directly below the ribs of protruding plus shaped segment 18. A dome switch 26 rests on the center of the upper surface of substrate 20 and provides a tactile feel when downward force is applied to pad 14 and transmitted through protruding plus shaped segment 18 to dome switch 26 which in application can be used to provide an electrical switch signal.

In operation of the present invention as shown in FIGS. 1 through 4, when an external force is applied by an operator's finger in dimple 12 tangent to the focal point of dimple 12 of pad 14, the force is transmitted through pad 14 of cover 10 deforming return ridge 16 thereby causing a rocking and downward movement of protruding plus shaped segment 18 resulting in the lower surface of protruding plus shaped segment 18 making physical contact with substrate 20 and shorting at least one conductive region 24 contact with an opposing conductive region 24 contact thereby creating a signal of measurable resistance. As the external force applied is varied in force or direction, the location of the contact made on the conductive regions 24 correspondingly changes resulting in a corresponding change in measurable resistance which may be translated by analog to digital or RC timing circuitry into speed and direction vectors. Additionally, variation in the degree of downward external force applied can be utilized for refined resolution as the protruding plus shaped segment 18 may be made of elastic type material When the external force is removed, the potential energy stored in return ridge 16 from the application of the force is utilized to return pad 14, and thus protruding plus shaped segment 18 to the unbiased position wherein no contact is made between protruding plus shaped segment 18 and conductive regions 24. When sufficient downward force is applied through dimple 12 and transmitted through protruding plus shaped segment 18 compressing dome switch 26, the operator is provided with a tactile feel. Additionally compression of the dome switch may be utilized to provide a selection switch, in the same manner as a button provided on a computer mouse for selection.

Figure 5:
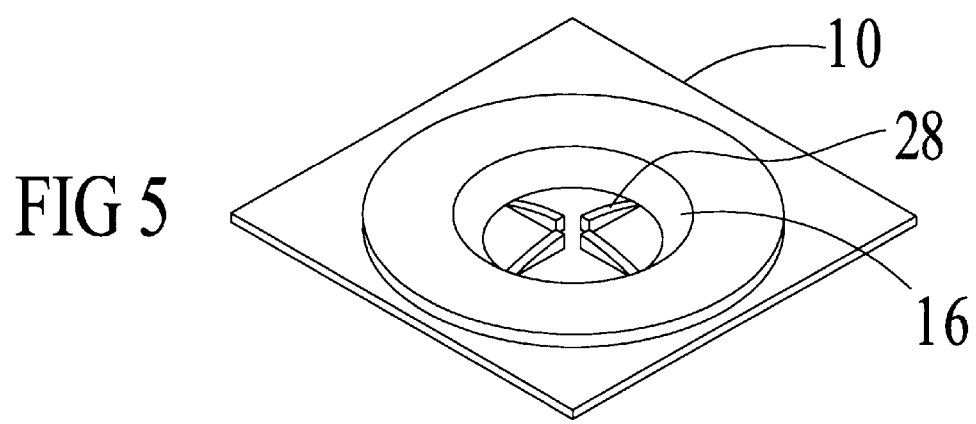
FIG. 5 is a perspective view of the bottom of the cover displaying a modified non-continuous form of the protruding plus shaped segment.

In FIG. 5 a modified form of the cover 10 is illustrated with a non-continuous protruding plus shaped segment 28 with a recess provided in the center of the non-continuous protruding plus shaped segment which would allow dome switch 26 to be recessed.

Figure 6:
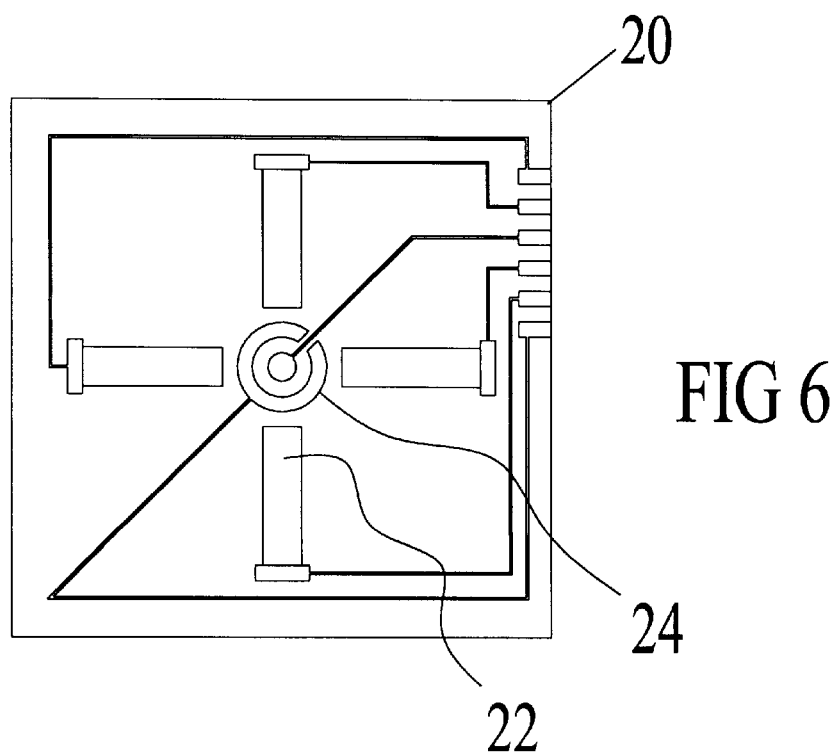
FIG. 6. is a plan view of the substrate with a modified layout of the resistive and conductive paths thereon.

FIG. 6 illustrates a modified form of the substrate 20 with continuous resistive regions 22 arranged directly below the ribs of protruding plus shaped segment 18 and where a potential voltage is applied to the lower surface of protruding plus shaped segment 18 through a dome switch 26 in contact with conductive region 24. In operation, when an external force is applied in dimple 12 tangent to the focal point of dimple 12 of pad 14, the force is transmitted through pad 14 of cover 10 deforming return ridge 16 and thereby causes a rocking and downward movement of protruding plus shaped segment 18 resulting in the lower surface of protruding plus shaped segment 18 making physical and electrical contact with at least one resistive region 22 of substrate 20. And since a potential voltage is applied to the lower surface of protruding plus shaped segment 18, a signal of measurable resistance which may be translated into speed and directional vectors is therefore provided corresponding to the amount and direction of the force applied.

Figure 7:
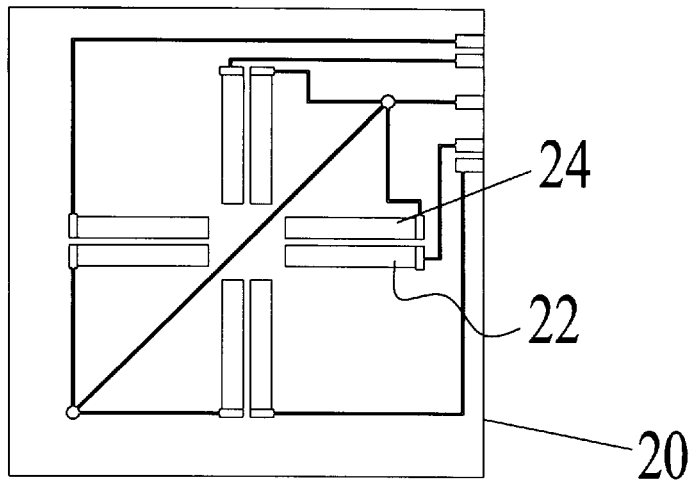
FIG. 7 is a plan view of the substrate with a modified layout of the resistive and conductive paths thereon.

FIG. 7 illustrates a modified form of the substrate 20 with resistive regions 22 and conductive regions 24 arranged adjacent to each other, with each pair of resistive region 22 and conductive region 24 arranged directly below the ribs of protruding plus shaped segment 18. In operation, when an external force is applied in dimple 12 tangent to the focal point of dimple 12 of pad 14, the force is transmitted through pad 14 of cover 10 deforming return ridge 16 and thereby causes a rocking and downward movement of protruding plus shaped segment 18 resulting in the lower surface of protruding plus shaped segment 18 making physical contact with substrate 20 and thereby shorting together at least one pair of resistive region 22 and conductive region 24 at a location corresponding to the amount and direction of the force applied. Consequently, a signal of measurable resistance is established which may be translated into speed and directional vectors.

An alternate embodiment of the present invention will now be described with reference to FIGS. 8 through 10. An alternate embodiment of the pad pointing device of the present invention shown In FIGS. 8 through 10 comprises a cover 10, which on its top surface has a dimple 12 formed within the top of the pad 14, wherein a finger may be placed within dimple 12 of pad 14 to apply compression and tilting forces in operation of the pad pointing device. An integrated button is also provided within dimple 12 of pad 14. Cover 10 is formed with a return ridge 16 surrounding pad 14, which may be caused to bend and flex when external force is applied to pad 14 through dimple 12, and which causes pad 14 to return to an unbiased position when such external force is removed from pad 14. Further, cover 10 has a protruding plus shaped segment 18 formed on or attached to its bottom surface directly below dimple 12 and encircled within return ridge 16; protruding plus shaped segment 18 is shaped with a number of ribs which radiate out from its center at various angles and is preferably formed of an elastic material that may be deformed when a force is applied. The pad pointing device further comprises a membrane switch 30 which has resistive regions 22 and conductive regions 24 formed on or within is top surface. The resistive regions 22 and the conductive regions 24 are arranged on membrane switch 30 in such orientation that when assembled they are situated directly below the ribs of protruding plus shaped segment 18. In assembled fashion, the membrane switch 30 is folded over upon itself so that resistive regions 22 are aligned with and are facing conductive regions 24 and a rigid backer surface 32 is placed under membrane switch 30. Dielectrics 36 are provided for on the surface of membrane switch 30 to prevent the membrane switch 30 surfaces from making contact in the unbiased position. A digital wake-up switch contact 38 is also provided in the center of the resistive regions 22.

Figure 8:
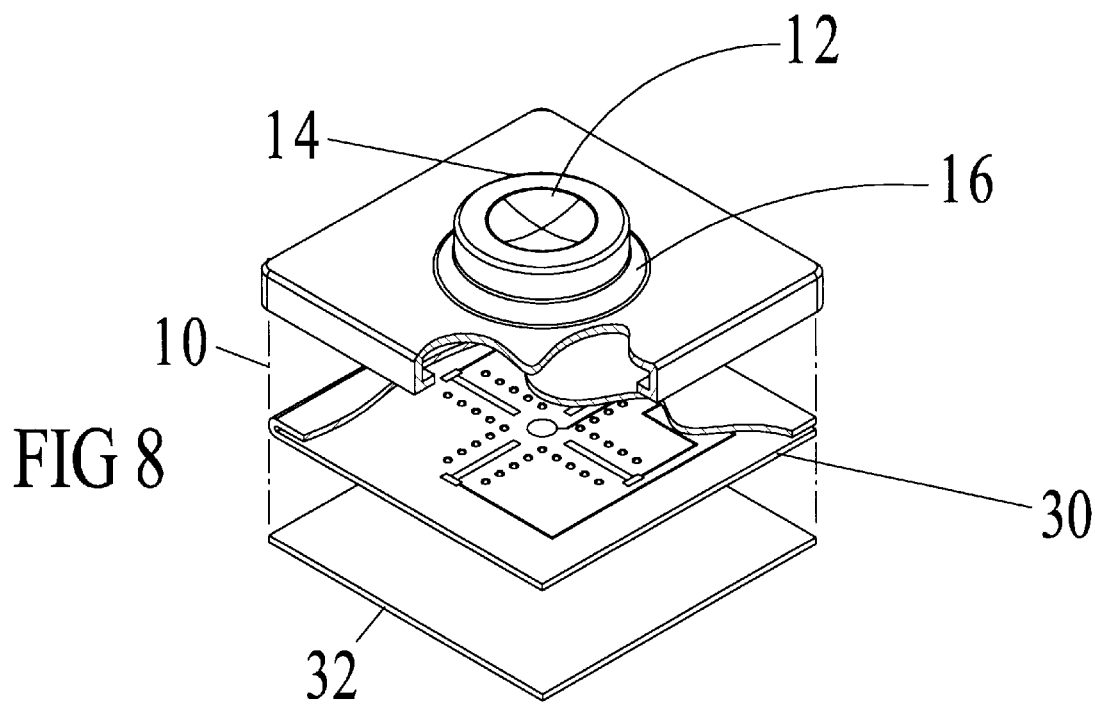
FIG. 8 is an exploded perspective view of a modified form of the present invention utilizing a membrane switch as the substrate.
Figure 9:
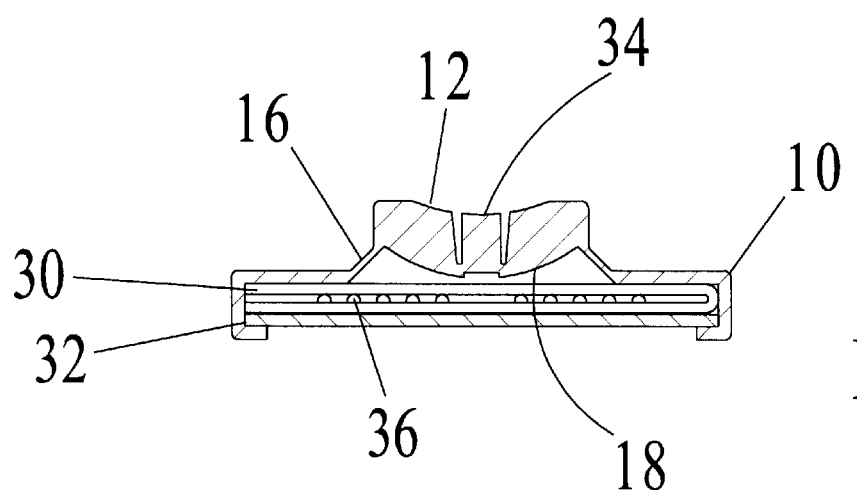
FIG. 9 is a sectional view of the present invention shown in FIG. 8 with a modified form of the cover incorporating a built in switch button.
Figure 10:
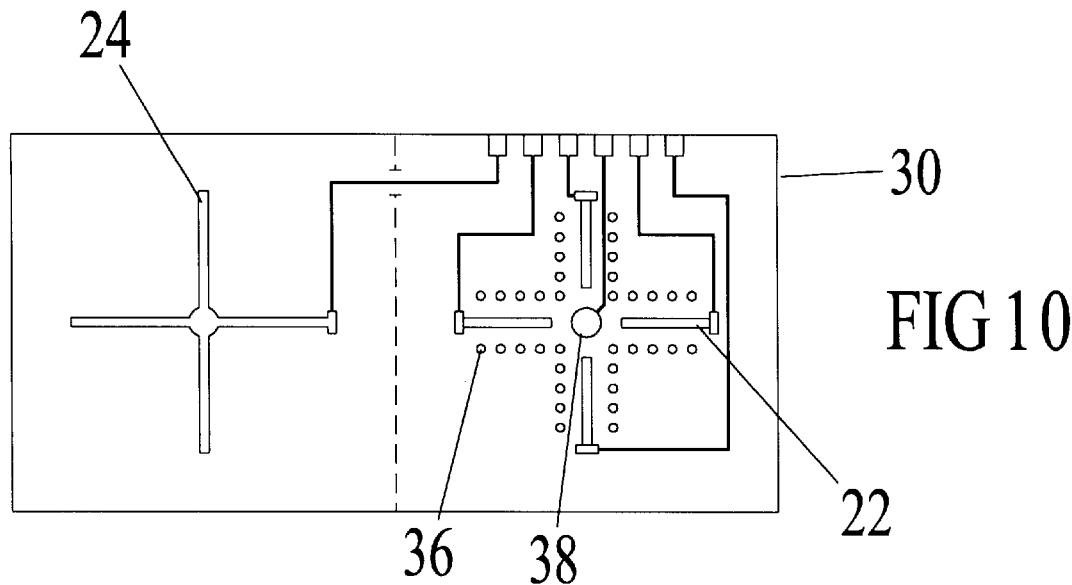
FIG. 10 is a plan view of the membrane switch and the resistive and conductive paths and dielectrics thereon.

In operation of the alternate embodiment of the present invention as shown if FIGS. 8 through 10, when an external force is applied by an operators finger in dimple 12 the force is transmitted through pad 14 of cover 10 deforming return ridge 16 thereby causing a rocking and downward movement of protruding plus shaped segment 18 resulting in the lower surface of protruding plus shaped segment 18 making physical contact with the outside surface of the membrane switch 30 which is supported by rigid backer surface 32. The physical contact that is made by the protruding plus shaped segment 18 presses the two layers of the membrane switch 30 together, which shorts at least one of the conductive regions 24 with its opposing resistive region 22 at a position corresponding to the direction of the force applied. The shorting of the conductive region 24 with its opposing resistive region 22, completes a circuit causing a variable resistance. The greater the force applied in a given direction the further out from the center of substrate 20 the short occurs, corresponding to a measurable change in resistance. To effect refined movement, varying force may be utilized in a perpendicular compressive fashion to the membrane switch 30. The output resistance is interpreted by analog to digital or RC timing circuitry into speed and direction vectors. When the external force is removed, the potential energy stored in return ridge 16 from the application of the force is utilized to return pad 14, and thus protruding plus shaped segment 18 to the unbiased position wherein no contact is made between protruding plus shaped segment 18 and membrane switch 30.

Figure 11:
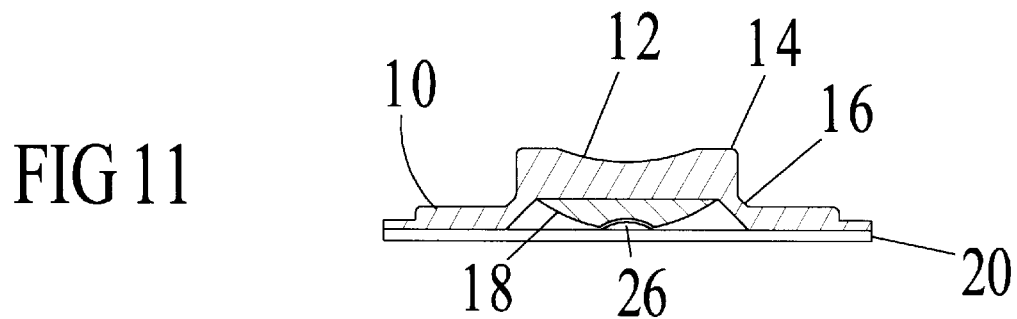
FIG. 11 is a sectional view of the present invention displaying a modified form of the protruding plus shaped segment which is recessed to accommodate the dome switch.

In FIG. 11 a modified form of the cover 10 is illustrated with a continuous protruding plus shaped segment 18 with a recess provided in the center of the continuous protruding plus shaped segment which would allow dome switch 26 to be recessed.

Figure 12:
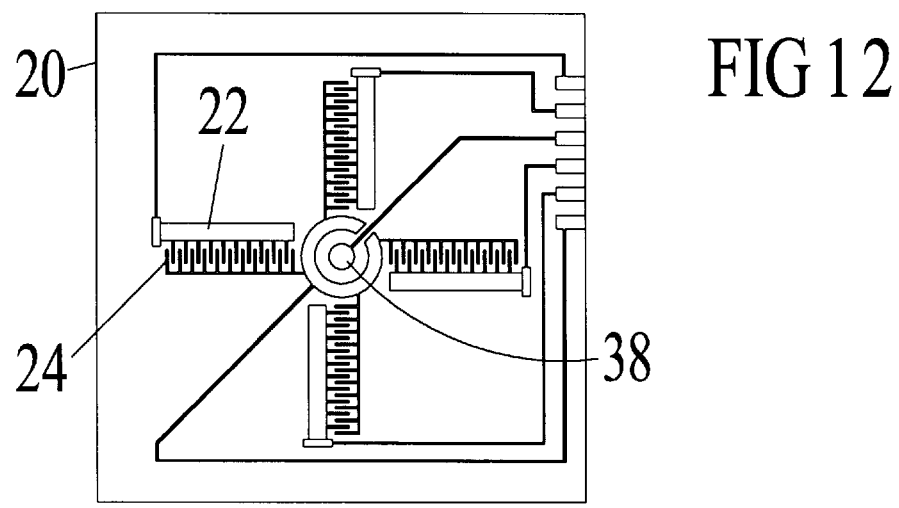
FIG. 12 is a plan view of the substrate with a modified layout of the resistive and conductive paths thereon.

FIG. 12 illustrates a modified form of the substrate 20 which has a digital wake-up switch contact 38 at its center and has resistive regions 22 and conductive regions 24 formed on or within is upper surface. The conductive regions 24 are arranged in an alternating ladder fashion of contacts radiating out from the center of substrate 20 at various angles. Each alternating contact in a conductive region 24 is electrically connected to a resistive region 22 at a location corresponding to its distance from the center of substrate 20 In use, the substrate 20 is to be positioned with its upper surface facing the bottom surface of cover 10 in such orientation that the conductive regions 24 are directly below the ribs of protruding plus shaped segment 18.

Figure 13:
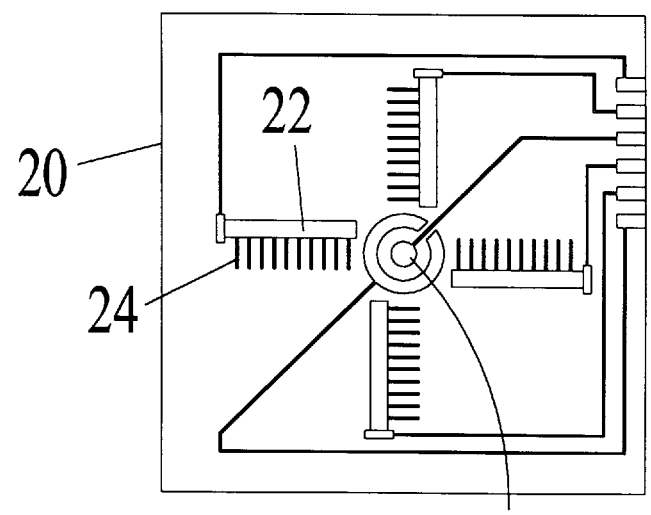
FIG. 13 is a plan view of the substrate with a modified layout of the resistive and conductive paths thereon.

FIG. 13 illustrates a modified form of the substrate 20 which has a digital wake-up switch contact 38 at its center and has resistive regions 22 and conductive regions 24 formed on or within is upper surface. The conductive regions 24 are arranged in a ladder fashion of contacts radiating out from the center of substrate 20 at various angles. Each contact in a conductive region 24 is electrically connected to a resistive region 22 at a location corresponding to its distance from the center of substrate 20. The conductive regions 24 are arranged directly below the ribs of protruding plus shaped segment 18. A potential voltage is applied to the lower surface of protruding plus shaped segment 18. In operation, when an external force is applied in dimple 12 tangent to the focal point of dimple 12 of pad 14, the force is transmitted through pad 14 of cover 10 deforming return ridge 16 and thereby causes a rocking and downward movement of protruding plus shaped segment 18 resulting in the lower surface of protruding plus shaped segment 18 making physical and electrical contact with at least one of the conductive regions 24 of substrate 20. And as a potential voltage is applied to the lower surface of protruding plus shaped segment 18, a signal of measurable resistance which may be translated into speed and directional vectors is therefore provided corresponding to the amount and direction of the force applied.

Figure 14:
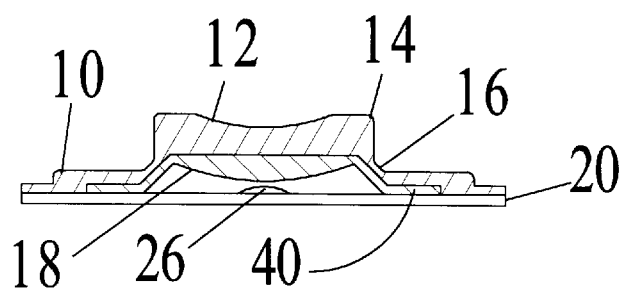
FIG. 14 is a sectional view of the present invention displaying a modified form of the cover having conductive legs extending from the protruding plus shaped segment and electrically contacting the substrate.
Figure 15:
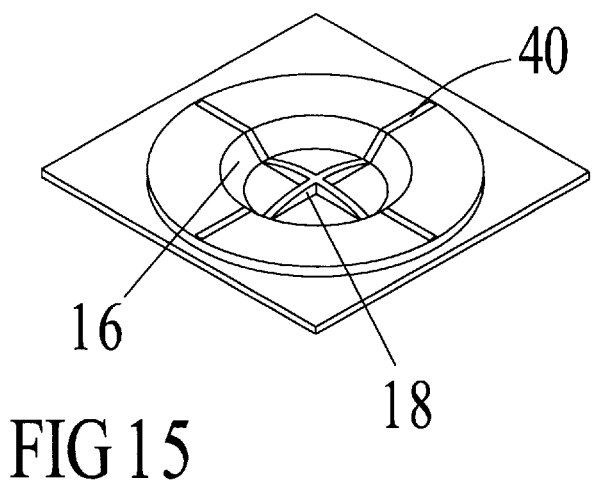
FIG. 15 is a perspective view of the bottom of the cover shown if FIG. 14 displaying the conductive legs extending from the protruding plus shaped segment.
Figure 16:
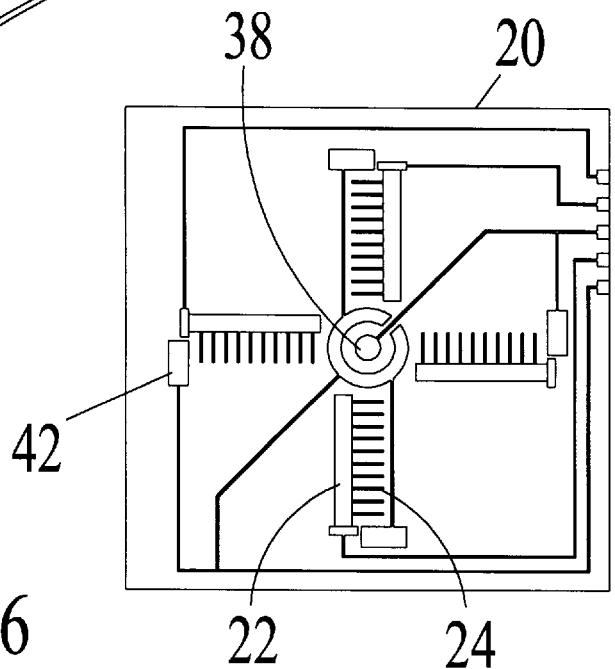
FIG. 16 is a plan view of the substrate with a modified layout of the resistive and conductive paths thereon which incorporate contacts for the conductive legs of the cover shown if FIG. 15.

FIGS. 14 through 16 illustrate a modified form of the present invention. In this modified form of the present invention cover 10, on its top surface has a dimple 12 formed within the top of the pad 14, wherein a finger may be placed within dimple 12 of pad 14 to apply compression and tilting forces in operation of the pad pointing device. Cover 10 is formed with a return ridge 16 surrounding pad 14, which may be caused to bend and flex when external force is applied to pad 14 through dimple 12, and which causes pad 14 to return to an unbiased position when such external force is removed from pad 14. Further, cover 10 has a protruding plus shaped segment 18 formed on or attached to its bottom surface directly below dimple 12 and encircled within return ridge 16; protruding plus shaped segment 18 is shaped with a number of ribs which radiate out from its center at various angles and is preferably formed of an elastic material that may be deformed when a force is applied. The lower surface of protruding plus shaped segment 18 is electrically conductive or resistive. A conductive leg 40, formed on or within cover 10, and in electrical contact with the lower surface of protruding plus shaped segment 18, extends outward and beyond the return ridge 16 toward the periphery of cover 10 from each rib of protruding plus shaped segment 18. Additionally, in this modified version of the present invention the substrate 20 has a digital wake-up switch contact 38 at its center and has resistive regions 22 and conductive regions 24 and leg contact points 42 formed on or within is upper surface. The conductive regions 24 are arranged in a ladder fashion of contacts radiating out from the center of substrate 20 at various angles. Each leg contact point 42 is positioned such that when the substrate 20 is fitted below the cover 10 conductive legs 40 are in electrical contact with leg contact points 42. Each contact in a conductive region 24 is electrically connected to a resistive region 22 at a location corresponding to its distance from the center of substrate 20. The conductive regions 24 are arranged directly below the ribs of protruding plus shaped segment 18.

In operation of the modified form of the present invention as illustrated in FIGS. 14 through 16, a potential voltage is applied to the lower surface of protruding plus shaped segment 18 by electrical contact through conductive legs 40 which are in electrical contact with leg contact points 42. When an external force is applied in dimple 12 tangent to the focal point of dimple 12 of pad 14, the force is transmitted through pad 14 of cover 10 deforming return ridge 16 and thereby causes a rocking and downward movement of protruding plus shaped segment 18 resulting in the lower surface of protruding plus shaped segment 18 making physical and electrical contact with at least one of the conductive regions 24 of substrate 20. As a potential voltage has been applied to the lower surface of protruding plus shaped segment 18, a signal of measurable resistance which may be translated into speed and directional vectors is therefore provided corresponding to the amount and direction of the force applied.

Although the detailed description of the drawings is directed toward illustrating the above described embodiments, the present invention is not limited to such embodiments, as variations and modifications may be made without departing from the scope of the present invention as claimed herein.

What is claimed is:

1. A multi-speed multi-direction analog pointing device comprising:

a plus shaped upper contact having a central axis and having a number of ribs which radiate out from said central axis, and further wherein said upper contact has a bottom surface, and further wherein said bottom surface is electrically conductive;

a substrate having an upper surface arranged below said upper contact and having a plurality of electrical contact points on said upper surface situated below said bottom surface of said plus shaped upper contact and aligned with said ribs; and displacement means for tilting and downwardly moving said plus shaped upper contact wherein said displacement means has an undeflected position and may be variably deflected when an external force is applied whereby electrical contact is made between said bottom surface of said plus shaped upper contact and at least one of said electrical contact points at a position corresponding to the direction and intensity of said external force.

2. The multi-speed multi-direction analog pointing device according to claim 1, wherein said displacement means comprises a cover, to which said plus shaped upper contact is attached, and a return ridge surrounding said plus shaped upper contact wherein said return ridge is elastic and which is deformed upon application of said external force, tilting and downwardly moving said plus shaped upper contact in a direction and distance corresponding to the direction and intensity of said external force.

3. The multi-speed multi-direction analog pointing device according to claim 2, wherein said plus shaped upper contact is elastic and which is variably deformed when in contact with said upper surface of said substrate by application of additional external force in a downward direction thereby creating electrical contact between said bottom surface of said plus shaped upper contact and said upper surface of said substrate at a number of said electrical contact points corresponding to the intensity of said additional external force in a downward direction.

4. The multi-speed multi-direction analog pointing device according to claim 2, wherein said plurality of electrical contact points on said upper surface of said substrate is comprised of continuous strips of resistive material situated below said bottom surface of said plus shaped upper contact and aligned with said ribs.

5. The multi-speed multi-direction analog pointing device according to claim 2, wherein said bottom surface of said upper contact is resistive.

6. The multi-speed multi-direction analog pointing device according to claim 2, wherein said bottom surface of said upper contact is convex.

7. A multi-speed multi-direction analog pointing device comprising:
   a plus shaped upper member having a central axis and having a number of ribs which radiate out from said central axis;
   a two layered membrane switch having a plurality of electrical contact points on a first layer which face a corresponding plurality of electrical contact points on a second layer, wherein said plurality of electrical contact points on said first layer and said corresponding plurality of electrical contact points on said second layer are situated below said bottom surface of said plus shaped upper member; and further wherein said two layered membrane switch has an undeformed position in which said plurality of electrical contact points on said first layer is separated from said corresponding plurality of electrical contact points on said second layer; and
   displacement means for tilting and downwardly moving said plus shaped upper member wherein said displacement means has an undeflected position and may be variably deflected when an external force is applied whereby contact is made between said bottom surface of said plus shaped upper member and said two layered membrane switch, deforming said two layer membrane switch and causing at least one of said electrical contact points on said first layer to make contact with said corresponding electrical contact point on said second layer at a location corresponding to the direction and intensity of said external force.

8. The multi-speed multi-direction analog pointing device according to claim 7, wherein said displacement means comprises a cover, to which said plus shaped upper member is attached, and a return ridge surrounding said plus shaped upper member wherein said return ridge is elastic and which is deformed upon application of said external force, tilting and downwardly moving said plus shaped upper member in a direction and distance corresponding to the direction and intensity of said external force.

9. The multi-speed multi-direction analog pointing device according to claim 8, wherein said plus shaped upper member is elastic and which is variably deformed when in contact with said two layered membrane switch by application of additional external force in a downward direction thereby causing electrical contact to be made between said electrical contact points on said first layer and corresponding electrical contact point on said second layer at a number of locations corresponding to the intensity of said additional external force in a downward direction.

10. The multi-speed multi-direction analog pointing device according to claim 8, wherein said plurality of electrical contact points on said first layer is comprised of continuous strips of resistive material situated below said bottom surface of said plus shaped upper contact and aligned with said ribs of said plus shaped upper contact, and wherein said corresponding plurality of electrical contact points on said second layer is comprised of continuous strips of conductive material facing said continuous strips of resistive material and situated below said bottom surface of said plus shaped upper contact and aligned with said ribs of said plus shaped upper contact.

11. The multi-speed multi-direction analog pointing device according to claim 8, wherein said bottom surface of said upper contact is convex.

12. A multi-speed multi-direction analog pointing device comprising:
   a plus shaped upper contact having a central axis and having a number of ribs which radiate out from said central axis, and further wherein said upper contact has a bottom surface, and further wherein said bottom surface is electrically conductive;
   a substrate having an upper surface arranged below said upper contact and having a first plurality of electrical contact points and a second plurality of electrical contact points, wherein said first plurality of electrical contact points and said second plurality of electrical contact points are located on said upper surface, situated below said bottom surface of said plus shaped upper contact and aligned with said ribs; and
   displacement means for tilting and downwardly moving said plus shaped upper contact wherein said displacement means has an undeflected position and may be variably deflected when an external force is applied whereby electrical contact is made between said bottom surface of said plus shaped upper contact and at least one of said first electrical contact points and at least one of said second electrical contact points simultaneously at a position corresponding to the direction and intensity of said external force.

13. The multi-speed multi-direction analog pointing device according to claim 12, wherein said displacement means comprises a cover, to which said plus shaped upper contact is attached, and a return ridge surrounding said plus shaped upper contact wherein said return ridge is elastic and which is deformed upon application of said external force, tilting and downwardly moving said plus shaped upper contact in a direction and distance corresponding to the direction and intensity of said external force.

14. The multi-speed multi-direction analog pointing device according to claim 13, wherein said plus shaped upper contact is elastic and which is variably deformed when in contact with said upper surface of said substrate by application of additional external force in a downward direction thereby creating electrical contact between said bottom surface of said plus shaped upper contact and said upper surface of said substrate at a number of said first electrical contact points and a number of said second contact points corresponding to the intensity of said additional external force in a downward direction.

15. The multi-speed multi-direction analog pointing device according to claim 13, wherein said first plurality of electrical contact points on said upper surface of said substrate is comprised of continuous strips of resistive material and said second plurality of electrical contact points on said upper surface of said substrate is comprised of continuous strips of conductive material, wherein each said continuous strip of resistive material has a companion said continuous strip of conductive material parallel to it wherein each said continuous strip of resistive material and its companion said continuous strip of conductive material are situated below said bottom surface of said plus shaped upper contact and aligned with one of said ribs.

16. The multi-speed multi-direction analog pointing device according to claim 13, wherein said first plurality of electrical contact points on said upper surface of said substrate is comprised of first continuous strips of resistive material and said second plurality of electrical contact points on said upper surface of said substrate is comprised of second continuous strips of resistive material, wherein each said first continuous strip of resistive material has a companion second continuous strip of resistive material parallel to it wherein each said first continuous strip of resistive material and its companion second continuous strip of conductive material are situated below said bottom surface of said plus shaped upper contact and aligned with one of said ribs.

17. The multi-speed multi-direction analog pointing device according to claim 13, wherein said bottom surface of said upper contact is resistive.

18. The multi-speed multi-direction analog pointing device according to claim 13, wherein said bottom surface of said upper contact is convex.

* * * * *